United States Patent [19]

Baba

[11] 4,106,604

[45] Aug. 15, 1978

[54] CONTROL UNIT FOR THROTTLE AND CLUTCHES

[75] Inventor: Masanao Baba, Takarazuka, Japan

[73] Assignee: Nippon Cable System Inc., Japan

[21] Appl. No.: 789,255

[22] Filed: Apr. 20, 1977

[30] Foreign Application Priority Data

Dec. 20, 1976 [JP] Japan ............................... 51-153751

[51] Int. Cl.$^2$ ...................... B60K 21/00; G05G 13/00

[52] U.S. Cl. .................................. 192/0.098; 74/876; 74/878; 74/527; 74/480 B; 192/18 R; 192/67 P

[58] Field of Search .......................... 192/0.096, 0.098; 74/876, 878

[56] References Cited

U.S. PATENT DOCUMENTS

| | | | |
|---|---|---|---|
| 3,127,785 | 4/1964 | Morse et al. | 192/0.096 |
| 3,309,938 | 3/1967 | Pervier | 192/0.096 |
| 3,741,045 | 6/1973 | Kobayashi | 192/0.098 |

*Primary Examiner*—Benjamin W. Wyche
*Attorney, Agent, or Firm*—Armstrong, Nikaido, Marmelstein & Kubovcik

[57] ABSTRACT

A control unit comprises a frame member, a drive shaft rotatably supported by the frame member, a lever member slidably mounted on the drive shaft, a shift rod secured to the lever member, locking means fitting around the drive shaft, a drive member turnably supported by the drive shaft and having a toothed portion and a circular outer peripheral edge, a clutch actuating member having a toothed portion meshable with the toothed portion of the drive member and inwardly curved locking edges, a clutch rod pivoted to the clutch actuating member, a driven member secured to the drive shaft, a drive pin mounted on the driven member, a throttle operating member turnably supported by the frame member and having a cam aperture slidably receiving the drive pin therein, and a throttle rod pivoted to the throttle operating member. The control unit operates the clutch and throttle mainly of a marine engine by a single lever and has an improved waterproof structure. The control cable remains free of any bending when the lever member is shifted to warm up the engine.

11 Claims, 5 Drawing Figures

CONTROL UNIT FOR THROTTLE AND CLUTCHES

BACKGROUND OF THE INVENTION

This invention relates to improvement in a single lever control unit for operating the clutch and throttle mainly of a marine engine.

Several control units of this type have heretofore been provided, but each of them has its own advantage and disadvantage. Particularly, single lever control units require means for disengaging the clutch actuating member for the warming up of the engine. Since the disengaging means is operated from outside the casing by a shift rod which is provided independently of the lever shaft, seawater ingresses into the disengaging means every time the shift rod is pulled out or pushed in, resulting in the deposition of salt which causes a trouble to the interior mechanism and possibly renders the mechanism inoperative.

Another structure is known in which the shift rod is integral with the lever shaft, such that the clutch actuating member is disengaged or engaged by pulling out or pushing in the lever shaft. With this structure, the number of the portions permitting the ingress of seawater into the interior of the casing is reduced, so that the structure has correspondingly improved waterproofness. However, when the lever shaft is operated as above, the throttle operating member moves axially of the lever shaft, consequently bending a control cable which is pivoted at it one end to the throttle operating member. The end of the control cable in the bent state is pivotally moved by the turn of the throttle operating member. This movement increases the friction between the sheath of the control cable and its inner wire (which is usually connected to the throttle operating member by a nonflexible rod), reducing the durability of the control cable and also impairing smooth operation of the lever. Moreover, the structure has another drawback that when the lever shaft is in its pushed-in position within the casing, the disengaging means is entirely unprotected from water.

OBJECTS OF THE INVENTION

An object of this invention is to provide an improved single lever engine control unit.

Another object of this invention is to provide a single lever engine control unit by which the throttle can be held out of operation until the engine clutch is compepletely changed over, the control unit further being adapted to retain the clutch in its engaged position while the throttle is in operation.

Another object of this invention is to provide a single lever engine control unit having an improved waterproof and rustproof structure.

Another object of this invention is to provide a single lever engine control unit in which the control cable is operable free of any bending when the lever is axially shifted for the warming up of the engine.

Still another object of this invention is to provide a single lever engine control unit including locking means by which the lever member can be locked in position not so as to alter the throttle range even when the throttle control rod on the control unit is subjected to a force delivered from the engine itself by way of the control cable.

Other objects of this invention will become apparent from the following description with reference to the accompanying drawings.

DETAILED DESCRIPTION

Figure 1:
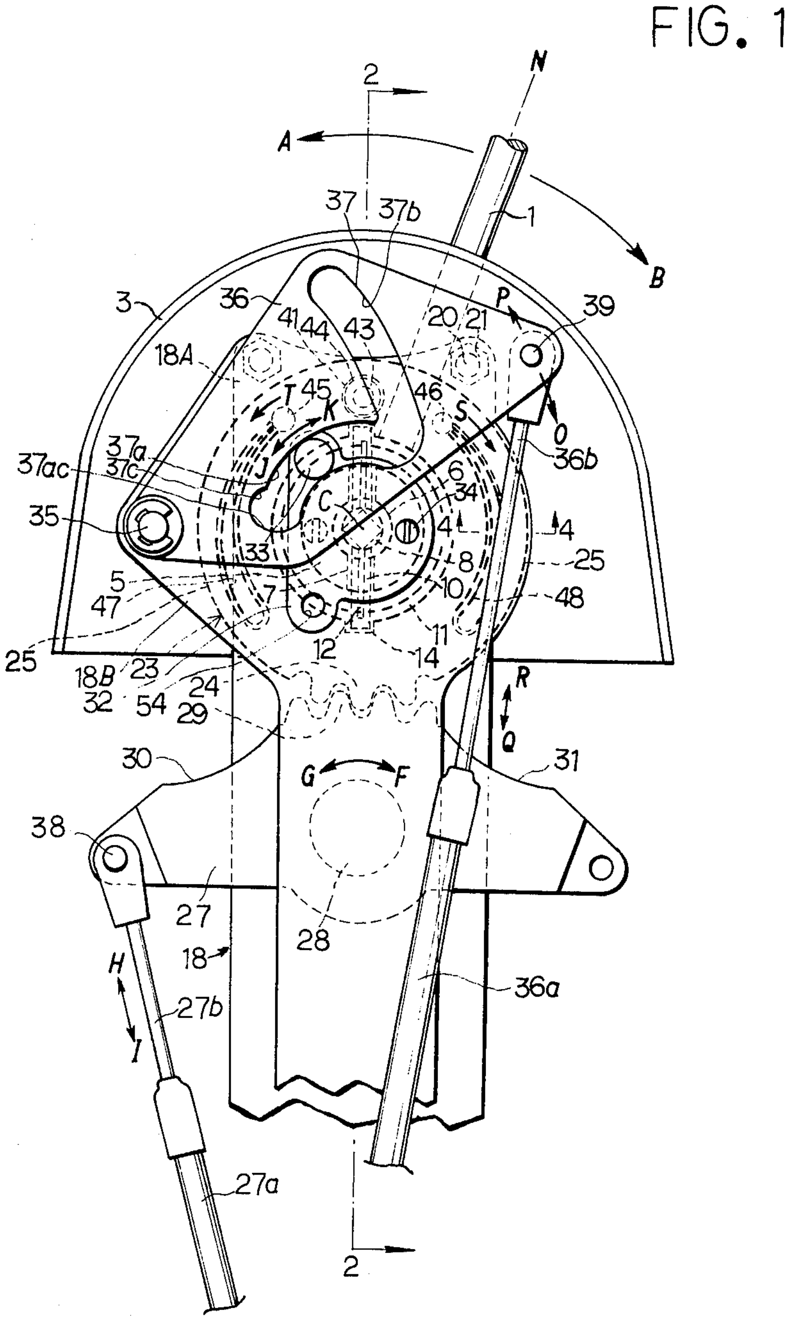
FIG. 1 is a front view partly broken away and showing an embodiment of this invention.
Figure 2:
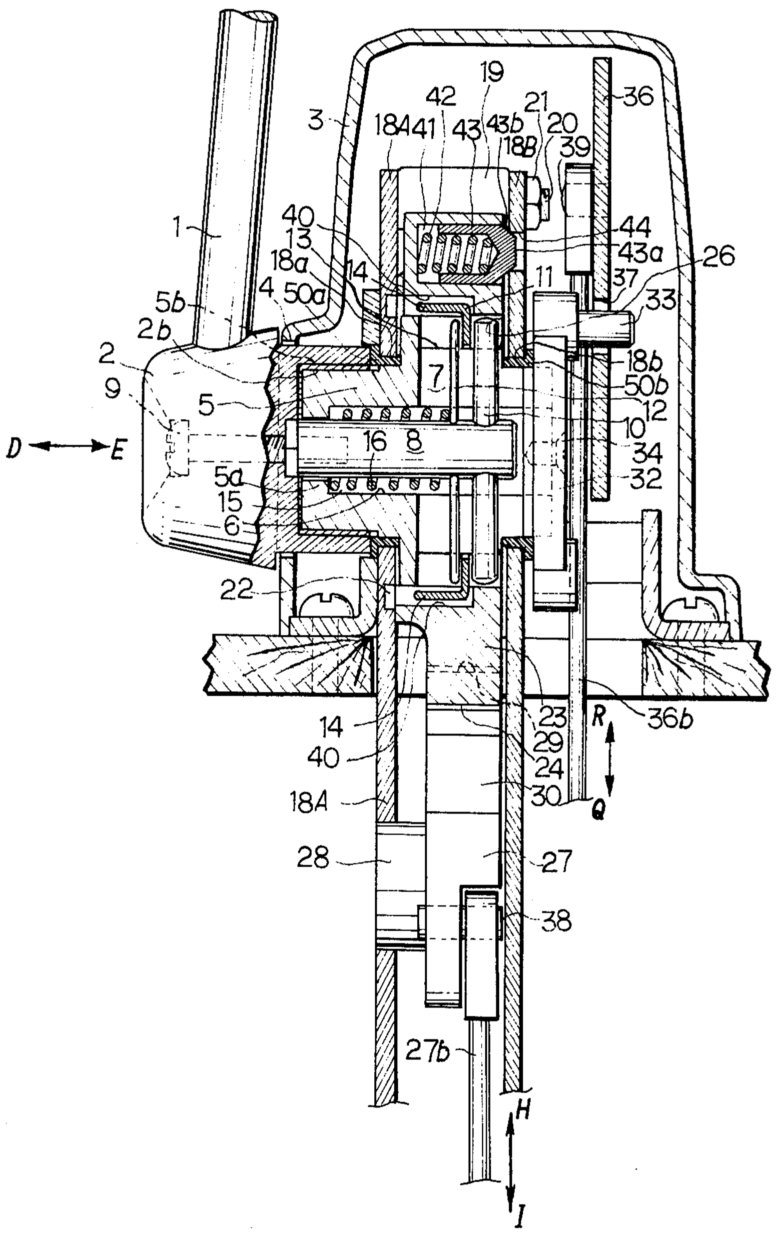
FIG. 2 is an enlarged view in section taken along the line 2—2 in FIG. 1.
Figure 3:
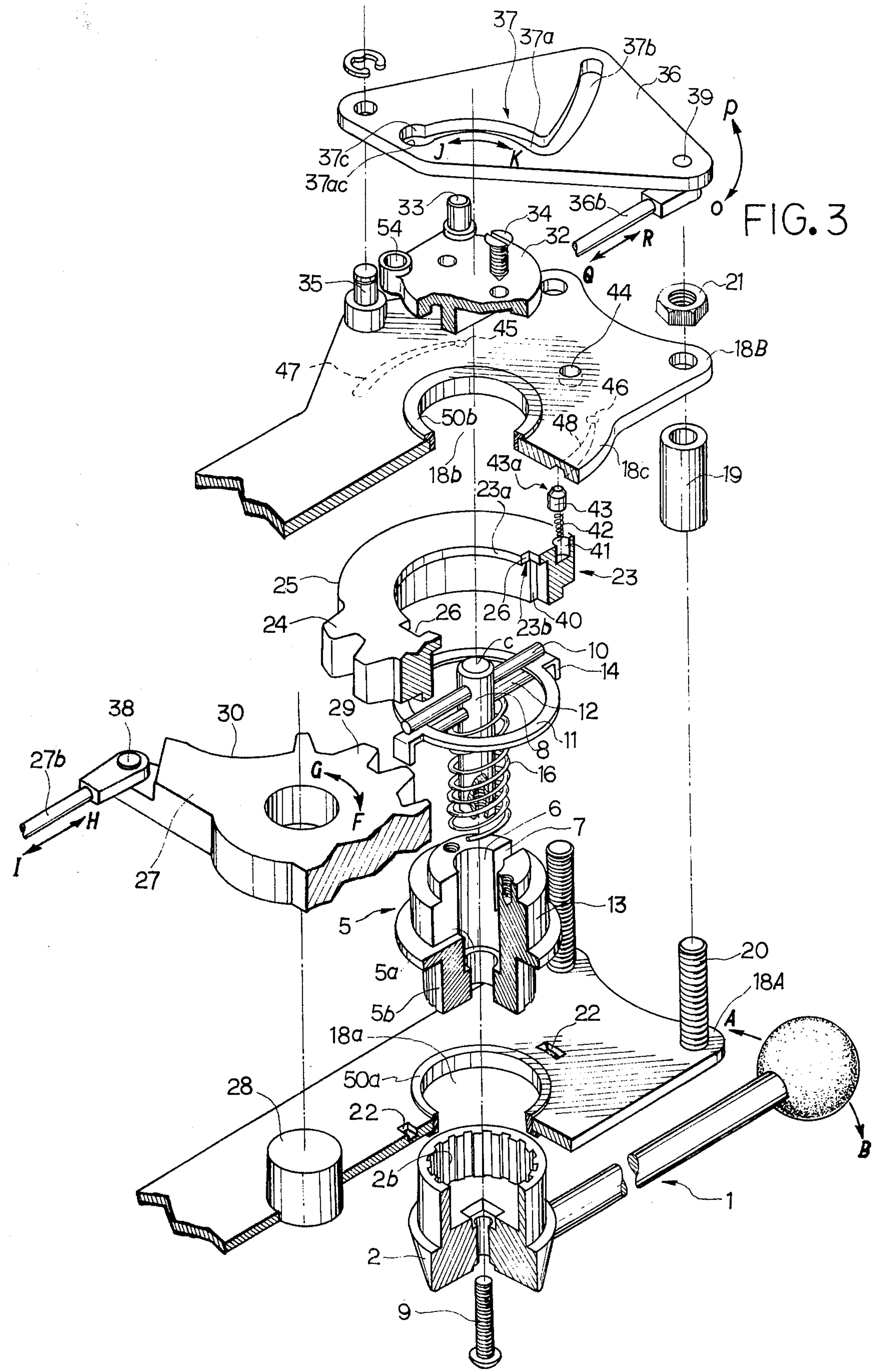
FIG. 3 is an exploded perspective view partly broken away to show the principal parts of the embodiment of FIG. 1.

With reference to FIGS. 1 to 3, a frame member 18 comprises a plate 18A and a plate 18B secured to the plate 18A by bolts 20 and nuts 21 with collars 19 interposed therebetween. A tubular drive shaft 5 is turnably supported by apertured portions **18*a* and 18*b* formed in the frame member 18. The boss portion 2 of a lever 1 fits around the drive shaft 5 with their serrated portions *2b* and 5*b* engaging each other and is slidable axially of the shaft. A casing 3 secured to the frame 18 has an opening 4 through which the boss portion 2 extends. The plate 18A is formed with first engaging means, such as at least one (e.g. two in this embodiment) locking cavity 22**.

The drive shaft 5 has an axial bore 6 extending through its center and is formed at its one end with second engaging means of suitable length extending across the bore 6. For example, this means is in the form of a divided groove 7. A shift rod 8 inserted in the bore 6 is secured at its one end to the boss portion 2 coaxially therewith by a bolt 9.

Third engaging means, such as an engaging pin 10, and a retaining pin 12 serving as retaining means are secured to the other end of the shift rod 8 and extend through the axis of the rod at right angles thereto. Locking means 11 sets in position between the engaging pin 10 and the retaining pin 12 juxtaposed therewith has at least one fourth engaging means, such as bent pawl 14, turnably supported by the outer peripheral surface 13 of the shaft 5. (The illustrated embodiment has two pawls 14.) A clearance 15 is formed between the outer peripheral surface of the shift rod 8 and the inner peripheral surface of the drive shaft 5 defining the bore 6. Spring means 16 in a compressed state is inserted in the clearance 15 with its one end bearing against an inwardly extending flange **5*a* on the shaft 5 and the other end thereof against the retaining pin 12. The force of the spring means biases both the shift rod 8 and the boss portion 2 in the direction E (see FIG. 2**) at all times.

A drive member 23 surrounding the drive shaft 5 has a toothed portion 24 and a circular outer peripheral edge 25. The drive member 23 is accommodated in the frame member 18 including the plate 18A and plate 18B and is formed with fifth and sixth engaging means. The fifth engaging means is first cutout grooves 26 in which at least one end (two ends in the illustrated embodiment) of the engaging pin 10 is inserted engageably. The sixth engaging means is second cutout grooves 40 in which the pawls 14 of the locking means 11 are slidable.

A clutch actuating member 27 turnably mounted on a pin 28 on the plate 18A has a toothed portion 29 engageable with the toothed portion 24 of the drive member 23. On the opposite sides of the toothed portion 29, the member 27 has inwardly curved locking edges 30 and 31 provided for the circular outer peripheral surface 25 of the drive member 23.

A driven member 32 having a drive pin 33 is secured by a screw 34 to the end of the drive shaft 5 where the groove 7 is formed, the member 32 covering the bore 6. A throttle operating member 36 turnably supported by a pin 35 on the plate 18B has a cam aperture 37 slidably receiving the drive pin 33 therein. The cam aperture 37 includes a circular arc portion 37*a* centered about the axis C of the shift rod 8, a bent portion 37*c* continuous with the portion 37*a* and extending slightly outward radially of the axis C, and a markedly bent portion 37*b*.

The clutch rod 27*b* of a control cable 27*a* connected to an unillustrated clutch mechanism for the engine is pivoted by a pin 38 to a suitable portion of the clutch actuating member 27.

The rod 36*b* of a control cable 36*a* connected to the unillustrated throttle means of the engine is pivoted by a pin 39 to a suitable portion of the throttle operating member 36.

A projectable and retractable restraining pin 43 fits in a cavity 41 formed in the drive member 23 and is biased by a spring 42 accommodated in the cavity. The restraining pin 43 has a tapered head 43*a* engageable in and disengageable from a neutral position notch 44, a forward position notch 45 and a reverse position notch 46 which are formed in the plate 18B.

The restraining grooves 47 and 48 to be described later in detail extend approximately from the notches 45 and 46 and are each in the form of a circular arc centered about the axis C.

The operation and advantages of the control unit of this invention will be described below. When the lever 1 is turned from its neutral position N in the direction A in FIG. 1, the restraining pin 43 is disengaged from the notch 44. The turn of the boss portion 2, namely the shift rod 8, rotates the drive shaft 5 and the drive member 23, since the engaging pin 10 is in engagement with the first cutout grooves 26. The rotation of the drive member 23 turns the clutch actuating member 27 in the direction F by virtue of the engagement of the toothed portion 24 with the toothed portion 29, pulling the clutch rod 27*b* in the direction H and thereby engaging the engine clutch in its forward position. The restraining pin 43 fits in the notch 45. When the clutch actuating member 27 fully turns in the direction F, the curved locking edge 30 comes into engagement with the circular outer peripheral edge 25 of the drive member, whereby the clutch actuating member 27 is locked in its specified turned position even after the disengagement of the toothed portion 29 from the toothed portion 24. On the other hand, since the drive pin 33 on the driven member 32 is engaged in the portion 37*a* of the cam aperture 37, the throttle operating member 36 does not follow the turn of the driven member 32 which is driven by the drive shaft 5, while the drive pin 33 moves through the cam aperture portion 37*a* in the direction J. Simultaneously when, or some time after, the locking edge 30 of the clutch actuating member comes into engagement with the circular peripheral edge 25 of the drive member, the drive pin 33 comes into contact with an end face 37*ac* defining the cam aperture portion 37*a*. The lever 1, when further turned in the direction A, moves the restraining pin 43 out of the notch 45 and also moves the drive pin 33 in the direction J. This movement of the pin 33 turns the throttle operating member 36 in the direction O, advancing the throttle to propel the boat forward at a high speed. During the turn of the throttle operating member 36 in the direction O caused by the movement of the drive pin 33, the drive pin 33 is held engaged in the bent cam aperture portion 37*c*, so that an external force, if applied directly or indirectly to the throttle operating member 36, will not alter the throttle range, permitting the boat to advance at a speed corresponding to the angular displacement of the lever 1.

As the lever 1 turned in the direction A is returned to its neutral position N, the drive pin 33 engaged in the bent cam aperture portion 37*c* turns the throttle operating member 36 in the direction P first, pulling the rod 36*b* in the direction R and reducing the throttle range. The drive pin 33 thereafter starts to move through the cam aperture portion 37*a* in the direction K. At that time, the toothed portion 24 comes into meshing engagement with the toothed portion 29 and turns the clutch actuating member 27 in the direction G. The member 27 therefore pushes the rod 27*b* to the position shown in FIG. 1, thereby bringing the clutch to its neutral position.

The shift of the lever 1 from its neutral position N toward the direction B will now be described. The rotation of the drive member 23 turns the clutch actuating member 27 in the direction G, pushing the rod 27*b* in the direction I to change over the clutch, for example, to reverse. The restraining pin 43 fits in the notch 46. The turn of the clutch actuating member 27 in the direction G brings the curved locking edge 31 into engagement with the circular peripheral edge 25, whereby the clutch actuating member 27 is locked against rotation. At that time, the drive pin 33 on the driven member 32 completes its movement toward the direction K within the cam aperture portion 37*a*. When the lever 1 is turned further toward the direction B, the restraining pin 43 disengages from the notch 46, and the drive pin 33 advances into the cam aperture portion 37*b*, turning the throttle operating member 36 in the direction O. This movement pushes the rod 36*b* in the direction Q, reversely propelling the boat at a progressively increasing speed. As the lever 1 in this state is returned toward its neutral position N, the turn of the throttle operating member 36 in the direction P reduces the throttle range, and the subsequent turn of the clutch actuating member 27 in the direction F pulls the rod 27*b* in the direction H and returns the clutch to its neutral position.

Figure 4:
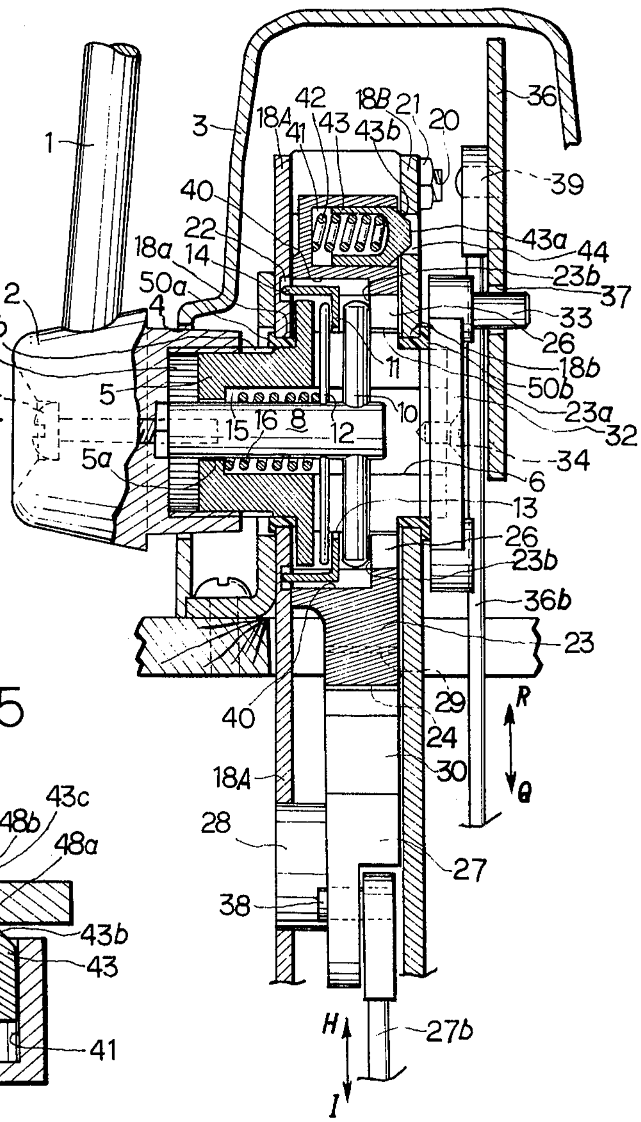
FIG. 4 is a sectional view corresponding to FIG. 2 and showing the embodiment with a lever member axially shifted.

The control unit operates in the following manner when warming up the engine. When the boss portion 2 of the lever 1 is pulled in the direction D against the force of the spring 16, the boss portion moves in the same direction along with the shift rod 8 by being guided by the serrated portion 2*b* sliding on the serrated portion 5*b*, with the drive shaft 5 in the original position (see FIG. 4). This brings the engaging pin 10 out of engagement with the first cutout grooves 26 of the drive member 23 and moves the pin 10 in direction D and brings the ends of the pawls 14 into the locking cavities 22 formed in the plate 18A. Even when the lever 1 in this position is turned in the direction A or B, the drive member 23 does not move, since engaging pin 10 is out of engagement with the first cutout grooves 26 without connecting the drive shaft 5 to the drive member 23. Thus the clutch actuating member 27 does not turn, maintaining the clutch in its neutral position. The drive member 23 in this state is not movable by an external force, because the pawls 14 of the locking means 11 positioned within the second cutout grooves 40 are engaged in the locking cavities 22 on the plate 18A, with the result that the clutch is locked in its neutral position. When the lever 1 in this state is further turned in the direction A or B, the rotation of the drive shaft 5 turns the driven member 32, causing the drive pin 33 engaged in the cam aperture 37 to turn the throttle operating member 36 alone. Accordingly, the throttle range is controllable as desired to warm up the engine effectively and with safety.

The boss portion 2 pulled in the direction D with the shift rod 8 against the action of the spring 16 need not be held pulled, since the engaging pin 10, when disengaged from the second cutout grooves 26 in the drive member 23 and turned, turns in sliding contact with the annular surface 23*b* of an inwardly projecting flange 23*a* in which the first cutout grooves 26 are formed. When the lever 1 is returned to its neutral position after the warming-up operation, the engaging pin 10 is brought into register with the first cutout grooves 26, whereupon the spring 16 acts to automatically fit the pin 10 into the grooves 26 to couple the drive shaft 5 to the drive member 23. The boat is now ready for propulsion.

The shift rod 8 is secured to the boss portion 2 (these portion may be made integral), so that the seawater can ingress into the control unit only through the clearances formed where the drive shaft 5 is slidingly supported by the plates 18A and 18B. The support portions can be made watertight with extreme ease merely by closing the clearances with grease or the like or by fitting elastic watertight bushes 50*a* and 50*b* to the support portions. Usually, the shift rod 8, spring 16, grooves, locking member having the pawls, apertured portions of the frame member 18, cavities, etc. (hereinafter referred to briefly as "the shift rod portions") are subject to troubles due to deposition of salt. However, according to the invention described above, the tubular drive shaft 5 is surrounded by the drive member 23, and the boss portion 2 is slidable on the tubular drive shaft 5 by the engagement between the serrated portions 2*b* and 5*b*, with the result that the shift rod portions can be fully and readily protected from water merely by the application of grease or the like.

This invention further provides novel restraining means for the throttle operating member 36 by which the throttle operating member 36 by which the throttle range is kept unchanged even when the lever 1 is released from the hand during navigation.

Such restraining means heretofore known require additional control member or a complex structure assembled with the control cable or the like for operating the throttle. The former is inconvenient to the operator, while the latter renders the control unit large-sized and is costly. In view of these drawbacks, the restraining means of this invention for the throttle operating member is automatically operable and has a greatly simplified structure.

Figure 5:
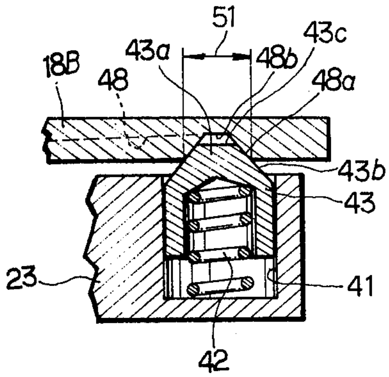
FIG. 5 is a fragmentary enlarged view in section showing a restraining groove and a restraining pin of the embodiment.

Generally, the throttle rod 36*b* is provided with a return spring (not shown) to prevent an increase of the throttle range due to some cause and to thereby ensure safety. The lever 1 tends to turn and alter the throttle range due to the repellant force of the return spring and further due to the vibration of the boat or the like caused even in the absence of the return spring. It is therefore greatly desired to provide automatic restraining means for maintaining a given throttle range against such an external force. The restraining means of this invention is shown in greater detail in FIG. 5. The restraining pin 43 fitting in the cavity 41 of the drive member 23 has a substantially tapered head 43*a* which is adapted to fit in and slide along the restraining groove 47 or 48 formed in the flat surface 18*c* of the plate 18B shown in FIG. 1. The restraining pin 43 engages in the notch 45 or 46 when the clutch is completely changed over to its forward or reverse position. According to the present embodiment, the restraining groove 47 or 48 extends from the notch 45 or 46 with a progressively increasing width and, when desired, a progressively increasing depth toward the direction in which the throttle range increases, namely toward the direction S or T in FIG. 1. Since the two grooves achieve the same result, the groove 48 will be described. When the restraining pin 43 shown in FIG. 5 is positioned for example at an intermediate portion (indicated at 4—4 in FIG. 1) of the restraining groove 48, the opposite slanting faces 43*b* of the head 43*a* are held by the force of the spring 42 in intimate contact with the opposite slanting faces 48*a* defining the groove 48 as is the case with a wedge, so that the restraining pin 43 is restrained by the plate 18B. Consequently, the drive member 23 is locked to the position to which it is turned by the lever 1. Thus, the throttle operating member 36 is held against turning even if subjected to an external force acting in either direction and delivered from the control cable 36*a* connected to the throttle. This permits the boat to travel at a constant speed even when the lever 1 is released from the hand. The restraining force exerted on the pin by the grooved portion decreases in the direction in which the width of the groove increases, whereas the force increases in the direction in which the groove width decreases because the pin progressively compresses the spring 42. The restraining groove having a progressively increasing width in the aforesaid direction is therefore suited to the case in which the return spring biases the rod 36*b* in the direction R. In the absence of the external force as of the return spring acting in one direction, the restraining groove may have a constant width. The head end 43*c* of the restraining pin 43 must be out of contact with the bottom 48*b* of the groove 48 as seen in FIG. 5, permitting the slanting faces 43*b* of the pin head to intimately contact the slanting faces 48*a* at all times.

The restraining force is easily variable as desired by altering the angle of the tapered head 43*a* and altering the angle of the slanting faces 48*a* in conformity with the head angle. Since the restraining pin 43 and the grooves 47 and 48 are very easy to shape, the restraining means will result in little or no cost increase and will not increase the size of the control unit.

In place of the restraining pin 43 described above, a ball (not shown) may be usable in combination with a groove in which the ball is engageable like a wedge. Thus the shape of the restraining pin and grooves are not limited to the illustrated examples.

In the case where the engine throttle, unlike the foregoing embodiment, is designed to advance when the rod 36*b* moves in the direction R, the throttle operating member 36 is removed from the pin 35 and turned upside down (not shown). The drive pin 33 is then removed from the illustrated position, fitted in a bore 54 formed in the driven member 32 and then engaged in the cam aperture 37. The unit is then operable as described.

Since the boss portion 2 is slidably in engagement with the drive shaft 5, the axial displacement of the boss portion 2 does not move the drive shaft axially thereof, thus rendering the driven member 32 turnable at the same position. As a result, the push-pull movement of the rod **36*b* caused by the turn of the throttle operating member does not enforce the undesirable bending (toward the right in FIG. 2) of the control cable involved in conventional units. The movement of the throttle operating member therefore will not impair the durability of the control cable 36*a*** which is operated especially frequently.

Additionally, the shift rod portions can be easily and fully protected from water according to this invention. The present unit is therefore adapted for an accurate and safety operation for a prolonged period of time and further has an automatic throttle locking function afforded by a greatly simplified structure.

Because many apparently widely different embodiments of the present invention may be made without departing from the spirit and scope thereof, it is to be understood that the invention is not limited to the specific embodiments thereof except as defined in the appended claims.

What we claim is:

1. A single lever engine control unit comprising:

a. a frame member having first engaging means;

b. a drive shaft rotatably supported by the frame member and having relatively elongated second engaging means extending substantially across its axis and an axial bore extending therethrough;

c. a lever member having a boss portion engaging the drive shaft and slidable axially of the drive shaft;

d. a shift rod secured to the boss portion of the lever member concentrically therewith and inserted in the axial bore of the drive shaft, the shift rod having third engaging means and retaining means juxtaposed with the third engaging means, the third engaging means being in engagement with the second engaging means of the drive shaft at all times;

e. locking means retained by the retaining means on the shift rod and having fourth engaging means, the locking means loosely fitting around the drive shaft, the fourth engaging means being engageable with the first engaging means of the flame member by the movement of the lever member only when the drive shaft is in its neutral position;

f. a drive member turnably supported by the drive shaft and having a toothed portion and a circular outer peripheral edge continuous with the toothed portion, the drive member having fifth engaging means for selective engagement with the third engaging means on the shift rod and sixth engaging means in engagement with the fourth engaging means of the locking means at all times;

g. a clutch actuating member turnably supported by the frame member and having a toothed portion engageable with the toothed portion of the drive member and inwardly curved locking edges continuous with the toothed portion and slidingly engageable with the circular peripheral edge;

h. a clutch rod pivoted to the clutch actuating member;

i. a driven member secured to the drive shaft and having at least one bore;

j. a drive pin mounted in the bore of the driven member;

k. a throttle operating member turnably supported by the frame member and having a cam aperture for receiving the drive pin therein, and l. a throttle rod pivoted to the throttle operating member.

2. A control unit as defined in claim 1 wherein spring means is provided for biasing the lever member toward the drive shaft.

3. A control unit as defined in claim 2 wherein the spring means is a coil spring fitting around the shift rod and inserted in the axial bore of the drive shaft.

4. A control unit as defined in claim 1 wherein the second engaging means is a divided groove formed in the drive shaft and extending through its axis, the third engaging means being a pin extending from the shift rod substantially at right angles to the axis thereof, the fifth engaging means being a first cutout groove formed in a flange portion of the drive member.

5. A control unit as defined in claim 1 wherein the first engaging means is a locking cavity formed in the frame member, and the fourth engaging means of the locking means is a pawl extending axially of the drive shaft, the sixth engaging means of the drive member being a relatively elongated second cutout groove formed in the drive member and extending axially of the drive shaft.

6. A control unit as defined in claim 1 wherein the cam aperture of the throttle operating member includes a circular arc portion centered about the axis of the lever member, and a short portion and a long portion extending from the opposite ends of the circular arc portion radially outward respectively.

7. A control unit as defined in claim 1 wherein the drive member is provided with a restraining pin having a substantially tapered head, the restraining pin projectably and retractably fitting in the drive member and being biased by a spring member, the frame member having at least one restraining grooved portion in which the head of the restraining pin is engageable in wedging contact therewith.

8. A control unit as defined in claim 7 wherein the restraining grooved portion has a progressively varying depth toward a direction away from the neutral position of the lever member.

9. A control unit as defined in claim 8 wherein the restraining grooved portion has a progressively increasing depth toward a direction away from the neutral position of the lever member.

10. A control unit as defined in claim 8 wherein the restraining grooved portion has a progressively decreasing depth toward a direction away from the neutral position of the lever member.

11. A control unit as defined in claim 7 wherein the restraining grooved portion has a constant depth.

* * * * *